(No Model.) 3 Sheets—Sheet 1.

C. W. BAIRD.
HAY RAKE AND LOADER.

No. 508,395. Patented Nov. 14, 1893.

Witnesses:
W. J. Sankey.
R. H. Orwig.

Inventor: Charles W. Baird,
By Thomas G. Orwig, Atty.

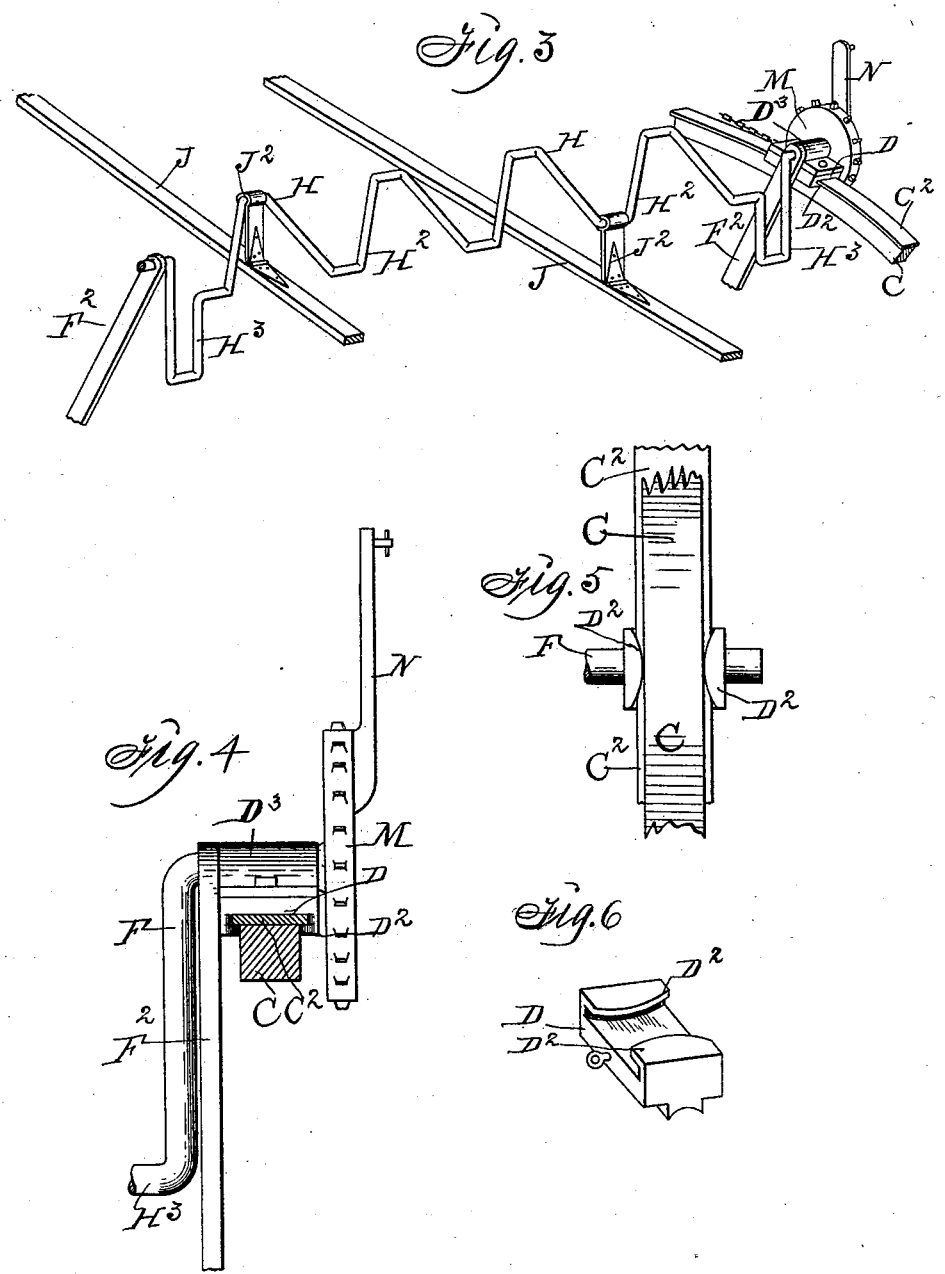

(No Model.) 3 Sheets—Sheet 3.
C. W. BAIRD.
HAY RAKE AND LOADER.
No. 508,395. Patented Nov. 14, 1893.
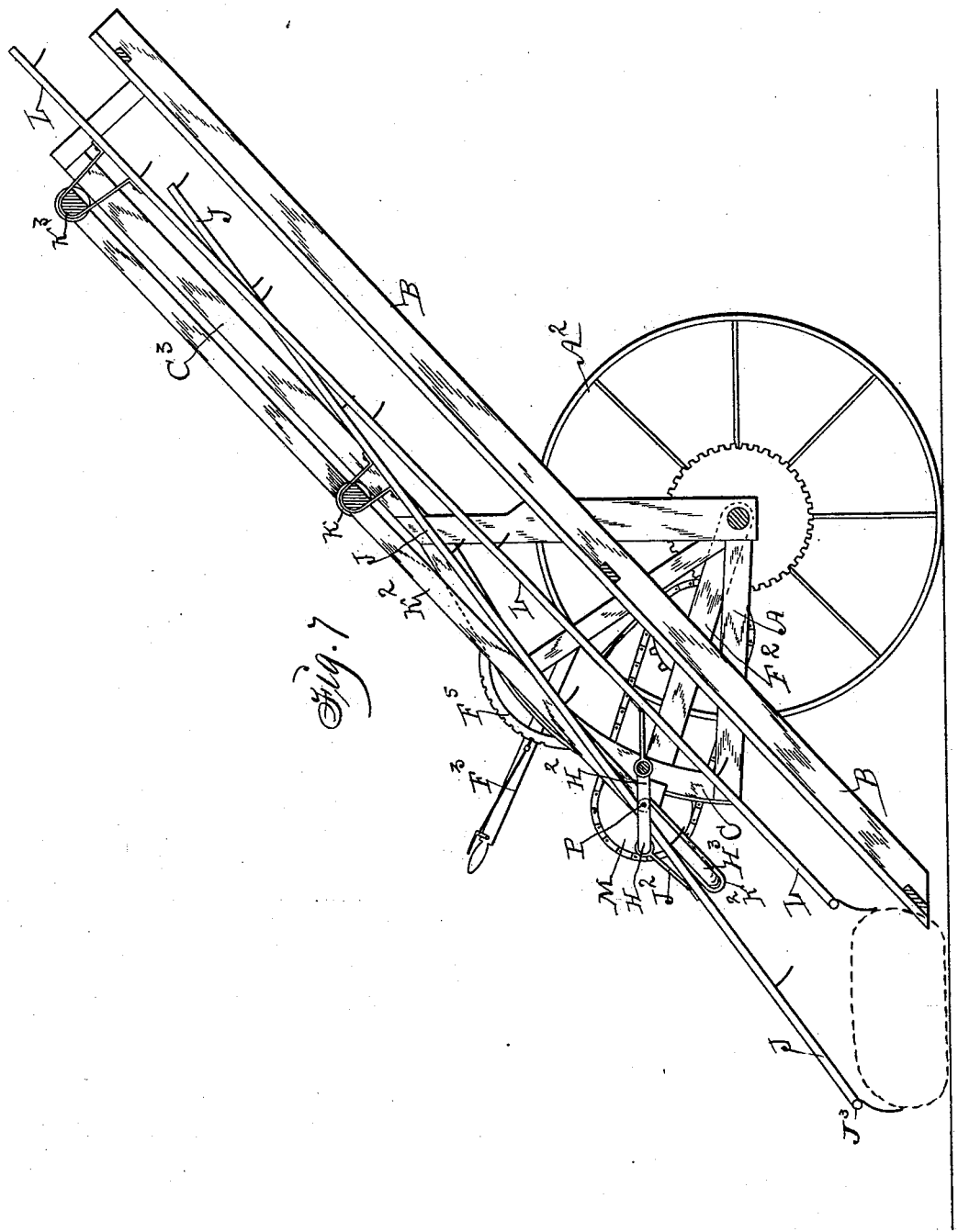
Witnesses
W. J. Sankey.
R. H. Orwig.
Inventor: Charles W. Baird,
By Thomas G. Orwig, Attorney.

UNITED STATES PATENT OFFICE.

CHARLES W. BAIRD, OF MILLERSBURG, IOWA.

HAY RAKE AND LOADER.

SPECIFICATION forming part of Letters Patent No. 508,395, dated November 14, 1893.

Application filed June 17, 1892. Serial No. 437,060. (No model.)

*To all whom it may concern:*

Be it known that I, CHARLES W. BAIRD, a citizen of the United States of America, residing at Millersburg, in the county of Iowa and State of Iowa, have invented a new and useful Improvement in Hay Rakes and Loaders, of which the following is a specification.

My invention relates to that class of machines in which rake bars are suspended to the cranks of a rotating shaft to alternately operate the rakes on the rear free ends of the parallel rake bars as required to engage and elevate hay.

Heretofore a crank shaft has been mounted upon arms hinged to the axle of a carriage in such a manner that the shaft could be raised and lowered as required to support the rakes when in operation and also elevate them to be carried inoperative. When there is more pressure upon one end portion of the shaft thus supported upon pivoted arms a longitudinal motion of the shaft occurs and produces a torsional strain upon the pivoted arms and a binding and increase of friction in the bearings of the shaft that requires additional draft force to operate the machine and also increase the wear.

My object is to provide fixed supports for the bearings of the crank shaft to prevent any lateral movement or vibration thereof and to avoid the torsional strain and increase of friction and wear incident to a machine when the crank shaft is carried upon arms pivoted to the carriage to lengthen the strokes or horizontal motions of the rakes and decrease their vertical motions and to thereby facilitate the gathering and elevating hay from the ground, and also to make them inoperative at pleasure.

My invention consists in the arrangement and combination of parts as hereinafter set forth, pointed out in the claims and illustrated in the accompanying drawings in which—

Figure 1:
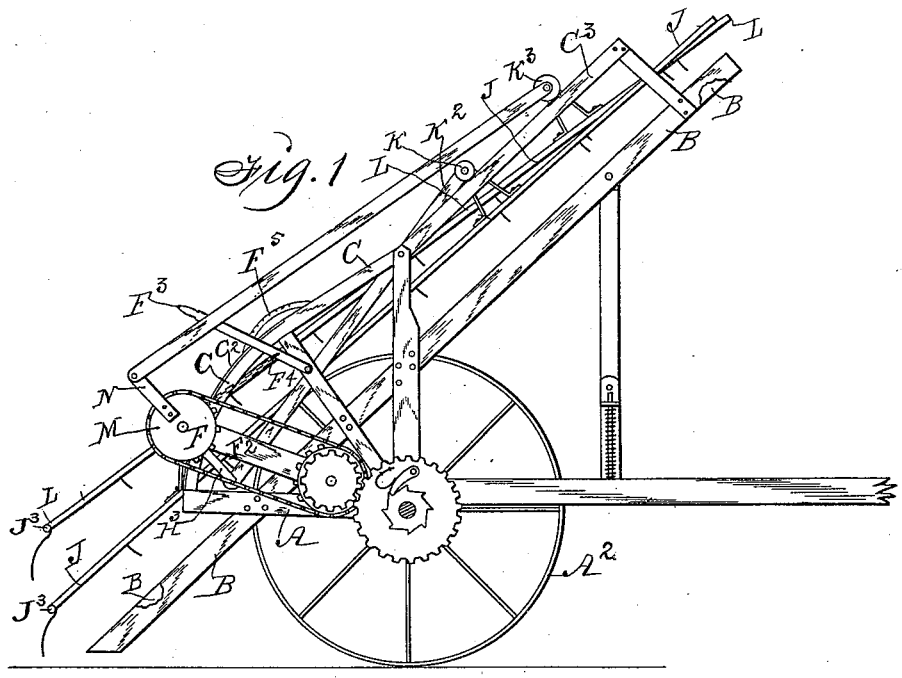
Figure 2:
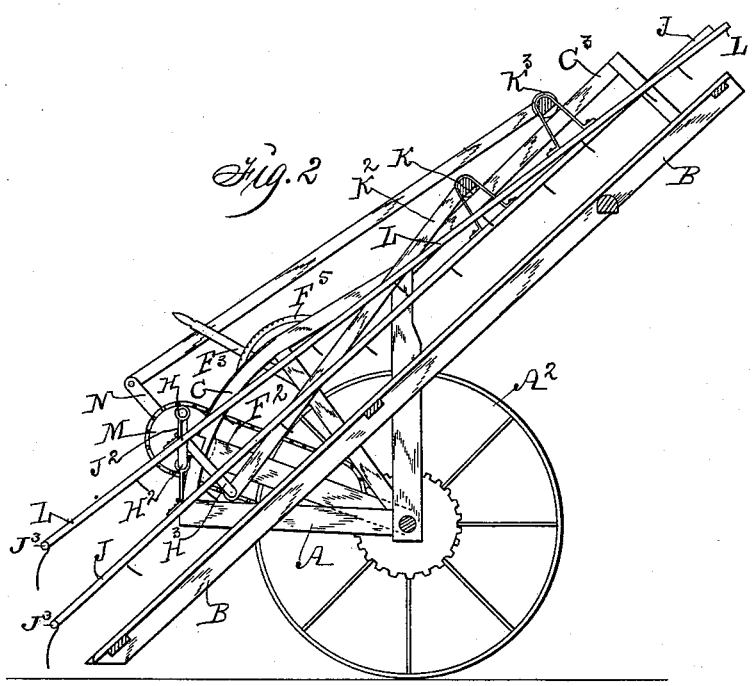

Figure 1 is a side view and Fig. 2 a vertical sectional view of the machine. Fig. 3 is a perspective view of a crank shaft and portions of rake bars connected therewith by means of links. Fig. 4 is an enlarged view of one of the end portions of the crank shaft mounted in a sliding bearing and having a combined sprocket wheel and crank fixed to its extremity. Fig. 5 is a bottom view of the sliding bearing and the track upon which it is supported. Fig. 6 is a perspective view of the bottom part or base of the sliding bearing in an inverted position. Fig. 7 is an enlarged sectional view of the machine showing one rake bar elevated as far as possible and another mating parallel bar and rake at the extremity of its downward and rearward stroke.

A represents a carriage frame mounted upon traction wheels $A^2$.

B are the parallel side pieces of an oblong frame fixed to the carriage frame to support operative mechanisms and to serve as an inclined plane upon which hay is advanced upward by means of toothed rake bars.

A curved track C is fixed to each side of the frame A and in concentric position with the axis of the wheels $A^2$ to support the sliding bearings of a crank shaft. It has a flanged top $C^2$ formed on or fixed thereto.

$C^3$ are straight upwardly inclined extensions of the tracks C fixed to the frame pieces B to support rollers at the upper ends of rake bars.

D is the base portion of a sliding bearing adapted to travel on the flanged top of the curved track C. It has flanges $D^2$ adapted to overlap the under sides of the flanges $C^2$ of the track C as shown in Fig. 4. The convex edges of the flanges engage the side faces of the track C and serve as pivots to allow lateral flexion and to relieve the crank shaft in the bearing from any torsional strain to which it may be subjected.

$D^3$ are the removable top parts of the sliding bearings.

F is a crank shaft mounted in the sliding bearings.

$F^2$ are straight bars pivotally connected with the carriage axle at their lower ends and with the crank shaft F at their upper ends in such a manner that they will carry the shaft in a concentric position relative to the axis of the axle and the tracks C. By thus connecting the crank shaft with the curved tracks C the crank shaft when lowered will be in a plane or line that forms an angle relative to the upper and straight portions $C^3$ of the tracks and consequently the strokes of the rake bars are moved over a longer space and in straighter lines at their lower ends as they are reciprocated and guided by means of the straight portions $C^3$ of the track. It is therefore obvious that the vertical or up and down motions of the rake heads will be shortened and occur quicker and their horizontal motions lengthened and the teeth kept longer upon the ground as required to gather hay and advance the hay to the inclined plane upon which it is to be elevated.

$F^3$ are levers pivoted to parts of the carriage frame and connected with the pivoted bars $F^2$, by means of chains $F^4$, in such a manner that the crank shaft and its bearings can thereby be elevated as required to adjust the rakes connected with the crank shaft relative to the ground and also to retain them inoperative whenever desired.

$F^5$ are segmental racks fixed to the frame to be engaged by latches carried by the levers $F^3$ as required to retain the levers in fixed position and at different points of elevation.

The central portion of the shaft F has lateral bends or cranks H and $H^2$ that extend in reverse ways to the axis of the shaft but in the same plane. Toothed rake bars J are suspended from the cranks on one side of the shaft F, by means of links $J^2$, as clearly shown in Fig. 3, and each bar has a toothed cross head or rake $J^3$ at its lower end.

$H^3$ are lateral bends and cranks at the end portions of the shaft that project at an angle of about forty five degrees relative to the cranks H and $H^2$. Cross-pieces connect the upper ends of the rake-bars J and rollers K on the ends of the cross pieces travel on the straight track $C^3$.

$K^2$ are straight bars pivotally connected with said cross-pieces and also with the cranks $H^3$ as required to impart reciprocating motions to the rake bars J.

A second series of rake bars L are connected in a similar manner with the tracks $C^3$ by means of a cross piece and rollers $K^3$ at their upper ends with the shaft F by means of sprocket wheels M on the ends of the shaft and crank arms N that project from the wheels at an angle of about forty-five degrees relative to the cranks H and $H^2$.

By projecting the cranks $H^3$ and N from the shaft F at angles of forty five degrees relative to the cranks H and $H^2$ it is obvious that when the throws of the bars or pitmen that connect the cross pieces to which the upper ends of the rake bars J and L are attached are completed, in either direction, the throws of the said rake bars are not completed but continued farther and thus lengthened and the vertical motions diminished so that the rakes will move backward and forward in practically parallel planes and the sweep of each rake upon the ground increased to facilitate the gathering of hay from the ground.

The wheels M are connected with the rotating carriage axle by means of gear wheels, sprocket wheels and drive chains as required to be actuated as the machine is advanced in a hay field. The two series of rake bars J and K thus connected with the shaft F will be simultaneously moved in opposite directions as required to alternately reach backward to engage hay on the ground and move it forward and upward, and the stroke of each rake is lengthened relative to the ground as required to facilitate gathering and elevating hay.

In Fig. 7 P represents the axis of the crank shaft F, and the crank arm N on the wheel M is in advance of the crank H and the rake on the end of the bar connected with the said crank H is at the extremity of its rearward motion and at a point relative to the ground as required to move forward, practically, parallel with the ground until it reaches the inclined plane upon which the hay will be elevated by the rectilinear reciprocating motions of the toothed rake bars. The rake bar connected with crank $H^2$ shows the extreme forward position assumed by the rake bars and the dotted lines connecting the two rake heads indicate the practically parallel lines traversed by the rakes in their forward and backward motion and at different elevations as required to alternately engage and gather and move forward and upward the hay met in the line of advance in the field.

I claim as my invention—

1. In a hay rake and loader a frame having parallel and inclined straight fixed tracks that terminate in downward curves at their rear and lower ends in concentric position with a carriage axle, a rotating crank shaft linked to the same axle by means of straight bars rake bars connected with the cranks of the crank shaft by means of links, sliding shaft bearings on the end portions of the crank shaft fitted to the curved tracks, reciprocating rake bars connected with cranks of the crank shafts, means for raising and lowering the crank shaft, and means for retaining it at different elevations, arranged and combined for the purposes stated.

2. The curved track C having flanges $C^2$ and the sliding shaft bearing D having flanges $D^2$, the crank shaft F, rake bars J and L, and bars $F^2$, arranged and combined with the frame and axle of a hay rake and loader, as shown and described, for the purposes stated.

3. In a hay rake and loader, a rotating shaft having lateral bends at its central portion extending in opposite directions and in the same plane to serve as cranks, lateral bends and cranks of greater lengths at its end portions extending at an angle of about forty five degrees relative to the shorter and central cranks, wheels fixed to the ends of the shaft and provided with cranks extending in the planes of the wheels at angles of about forty five degrees relative to the cranks extending from the rotating shaft, rake bars suspended from the cranks at the central portion of the shaft, sliding bearings on the ends of the crank shaft, curved tracks to support said sliding bearings, means for operating the sliding bearings on the said curved tracks means for supporting the upper ends of the rake bars, and bars for connecting the upper ends of the rake bars with the cranks at the end portions of the crank shaft, arranged and combined to operate in the manner set forth for the purposes stated.

4. The shaft F having cranks H and $H^2$ projecting in opposite directions in the same plane, cranks $H^3$ at the end portions extending at an angle relative to the said cranks H and $H^2$, sliding bearings on the ends of said crank shaft and curved tracks to support said sliding bearings sprocket wheels fixed to the ends of the shaft and provided with crank arms extending in the plane of the cranks $H^3$ and in opposite directions from the axle, means for rotating the sprocket wheels and shaft, rake bars, having rake heads at their lower ends, pivotally connected with the cranks H and $H^2$ by means of links and also connected at their upper ends with movable cross pieces supported upon tracks at the sides of an inclined plane fixed to the carriage frame and terminating in downward curves at their lower ends, sliding bearings upon said curved ends carrying said crank shaft F, and bars pivotally connected with the cranks at the end portions of the shaft and said cross pieces, all arranged and combined to operate in the manner set forth for the purposes stated.

CHARLES W. BAIRD.

Witnesses:
JOHN V. HATTER.
J. L. MILLER.